United States Patent [19]

Asensio et al.

[11] Patent Number: 4,927,684
[45] Date of Patent: May 22, 1990

[54] ASSEMBLY OF SEVERAL LAYERS HAVING ONE OR MORE REINFORCING LAYERS AND FIBER REINFORCED PLASTIC ARTICLE PRODUCED THEREFROM

[75] Inventors: Javier Asensio, Tägerwilen; Richard Hayman, Frauenfeld, both of Switzerland

[73] Assignee: The Dow Chemical Company, Midland, Mich.

[21] Appl. No.: 186,324

[22] Filed: Apr. 26, 1988

[30] Foreign Application Priority Data

Apr. 28, 1987 [CH] Switzerland ............................ 611/87

[51] Int. Cl.$^5$ ............................................. B32B 33/00
[52] U.S. Cl. ...................................... 428/91; 264/510; 264/513; 264/243; 428/95; 428/245; 428/248; 428/249; 428/251; 428/252; 428/284; 428/286; 428/287
[58] Field of Search ................... 428/91, 95, 245, 248, 428/249, 251, 252, 284, 286, 287; 264/510, 513, 243

[56] References Cited

U.S. PATENT DOCUMENTS

| | | | |
|---|---|---|---|
| 3,960,626 | 6/1976 | Casadevall | 156/93 |
| 4,044,188 | 8/1977 | Segal | 428/283 |
| 4,199,635 | 4/1980 | Parker | 428/95 |
| 4,228,208 | 10/1980 | Smith et al. | 428/95 |
| 4,410,577 | 10/1983 | Palmer et al. | 428/85 |
| 4,574,106 | 3/1986 | Rogers | 428/236 |

FOREIGN PATENT DOCUMENTS 788793 1/1958 United Kingdom .
1341438 12/1973 United Kingdom .

*Primary Examiner*—Marion C. McCamish

[57] ABSTRACT

A fiber reinforced plastic article which has a resinous matrix and a reinforcing material is provided with a smooth surface which can be easily painted by using a knitted or woven textile fabric having at least one tufted, fibrous, velvety, napped, brushed or pile surface as an external layer.

15 Claims, 1 Drawing Sheet

ASSEMBLY OF SEVERAL LAYERS HAVING ONE OR MORE REINFORCING LAYERS AND FIBER REINFORCED PLASTIC ARTICLE PRODUCED THEREFROM

BACKGROUND OF THE INVENTION

The present invention relates to an assembly of several layers having one or more reinforcing layers and to fiber reinforced plastic articles which have a resinous matrix and a reinforcing material.

Fiber reinforced plastic articles which have a resinous matrix and a reinforcing material are known.

In general, such composite parts are made from at least one, typically multiple reinforcing layers which are impregnated with a resin. The layers may be laid in place one layer at a time and then be impregnated with a resin. Alternatively, a prefabricated multiple layered structure, such as disclosed in U.S. Pat. No. 4,410,577 may be impregnated with a resin. The layered assembly is then cured, generally under heat and pressure, by conventional processes dependent on the resin system in use.

These fiber reinforced plastic articles have numerous known applications, particularly as structural components in airplanes, ships, boats and automobiles. One of their major advantages is their high strength at a low weight.

Frequently, the reinforcing layers in the plastic articles are in the form of a woven fabric. After curing the resin which forms the matrix of the plastic article, it is often desired to apply a finishing layer such as a paint or lacquer layer to the plastic article, especially when the article is intended to be used as an airplane, ship or car body part.

However, due to the weave pattern of the reinforcing layers, it is often difficult, or even impossible, to obtain a smooth surface of the plastic article after curing. Accordingly, even after applying a finishing layer, the weave pattern is still visible, which is generally undesirable. Another disadvantage of the reinforced plastic articles which do not have a smooth surface is the difficulty of avoiding voids or air bubbles when the finishing layer is applied.

U.S. Pat. No. 4,574,106 relates to a composite sheet consisting of a sheet of aluminium bonded to a mat of fiberglass which is bonded to several layers of fiberglass cloth. The mat of fiberglass should serve as a smooth finish when aluminium is removed after resin has been injected into the fiberglass cloth. Unfortunately, U.S. Pat. No. 4,574,106 neither addresses to nor solves the above described problems of surface imperfections in a mat of fiberglass.

U.S. Pat. No. 4,044,188 addresses to the problem of surface imperfections caused by the reinforcing materials embedded in the thermoplastic resin. It is suggested to produce a composite sheet which consist of a glass mat formed of long glass fibers which mat adheres, with a thermoplastic resin as a binder, to a surface layer consisting of (a) a thermoplastic resin, (b) short glass reinforcing fibers which are aligned parallel to the plane of the sheet and (c) a particulate filler. The short glass fibers and the filler are said to avoid migration of the glass mat reinforcement to the surface of the sheet during sheet fabrication. Unfortunately, the separate production of the surface layer for the specific use in the composite sheet is costly. Furthermore, the variety of materials which can be used for the composite sheet and the range of the weight ratios between these materials are limited which limits the use of composite sheet.

French Pat. No. 2 083 561 (equivalent to British Pat. No. 1341438) relates to a composite sheet containing (a) 30 to 95 weight percent of a thermoplastic resin, (b) 5 to 70 weight percent of thick glass fibers, (c) 0 to 60 weight percent of a filler and (d) 17 to 340 g/ml thin fibers in the form of a non-woven mat at the surface of the composite sheet. The sum of (a), (b), (c) and (d) is 100 weight percent. The thin fibers are for example produced of glass, polyester or polyamide. The surface of the composite sheet is more rich in resin than the rest of the composite sheet. French Pat. No. 2 083 561 teaches that the composite sheets have a smooth surface because of the particular combination of thin and thick fibers. Unfortunately, due to the particular combination of thin and thick fibers, the usefulness of the composite sheets is limited.

Accordingly, an object of the present invention is to provide other fiber reinforced plastic articles which have a smooth surface, i.e., a surface without substantial surface imperfections.

Furthermore, another object of the present invention is to provide other fiber reinforced plastic articles which can be coated with a finishing layer, such as a paint or lacquer, which have substantially no air bubbles or voids therein.

Yet another object of the present invention is to provide an assembly of several layers having one or more reinforcing layers which is useful as a reinforcing material for producing said fiber reinforced articles.

SUMMARY OF THE INVENTION

Surprisingly, it has been found that these objects are achieved by an assembly of several layers having
 (a) one or more reinforcing layers produced of unidirectional, bidirectional, multidirectional or random fibers or combinations thereof produced of glass, boron or carbon fibers, aromatic polyamide fibers, silicon carbide fibers or mixtures thereof and
 (b) one or two knitted or woven textile fabrics (2, 12) having at least one tufted, fibrous, velvety, napped, brushed or pile surface,
the textile fabric(s) (2, 12) being the external layer(s) of the assembly and the tufted, fibrous, velvety, napped, brushed or pile surface of the textile fabric(s) forming the surface(s) of the assembly.

This assembly of several layers is one aspect of the present invention. It is very useful as a reinforcing material for the fiber reinforced plastic articles.

Another aspect of the present invention is a fiber reinforced plastic article which has a resinous matrix and a reinforcing material which is characterized in that the reinforcing material is the assembly of several layers set forth above.

"Reinforcing material" as defined herein means the assembly of several layers including the reinforcing layer(s) and the textile fabric(s).

Yet another aspect of the present invention is a process for producing a fiber reinforced plastic article having a resinous matrix and a reinforcing material, wherein a textile fabric having at least one tufted, fibrous, velvety, napped, brushed or pile surface is placed in a mould in such a way that the tufted, fibrous, velvety, napped, brushed or pile surface faces the mould, one or more reinforcing layers produced of unidirectional, bidirectional, multidirectional or random fibers or combinations thereof produced of glass, boron or carbon fibers aromatic polyamide fibers, silicon carbide fibers or mixtures thereof are placed onto the knitted or woven textile fabric, the textile fabric and the reinforcing layer(s) are impregnated with a resin before or while they are, or after they have been, placed in the mould and the resin is then cured.

The present invention provides fiber reinforced plastic articles which do not have an undesirable irregular surface, for example a weave pattern caused by the reinforcing layers. The fiber reinforced plastic articles have a smooth surface without substantial surface imperfections. A finishing layer, such as a paint or lacquer, can be applied to the surface of the fiber reinforced articles in such a way that it is smooth and substantially without defects, such as air bubbles or voids.

Knitted or woven fabrics having a tufted, fibrous or pile surface have been used in composite materials, but for other purposes and accordingly in other types of assemblies of several layers.

French Pat. No. 2 396 649 (equivalent to U.S. Pat. No. 4,228,208) relates to a composite facing material adapted for bonding to a reinforcing material such as fiber reinforced resin or hydraulic cement. The composite facing material consists of a thermoplastic facing layer, such as polypropylene, and a "key" fabric which serves for bonding the thermoplastic facing layer to the reinforcing material. The "key" fabric has a base layer bonded to the thermoplastic facing layer and a fibrous pile secured to the base layer. The base layer of the key fabric is made from a thermoplastic material and is the same as or is compatible with the thermoplastic facing layer. The base layer of the key fabric may be a woven, knitted or non-woven fabric or a thermoplastic film. The fibrous pile adheres well to the reinforcing material. When the composite facing material is bonded to the reinforcing material a wall structure is produced such as vessels or pipes of chemical plants or walls of buildings.

British Pat. No. 788,793 relates to laminated insulating plates which comprise two glass fabric layers which are impregnated with a resin. A velvet-like woven glass fabric or a brushed or napped glass fabric is suggested. The brushed or napped surface of the glass fabric is rough and the other surface of the glass fiber is relatively smooth. The two glass fabric layers are superimposed with their rough surfaces adjoint whereby their fibers firmly felt together.

U.S. Pat. No. 3,960,626 relates to the production of a tape having elongate carrier fibers and a large number of short fibers disposed in a non-woven manner transversely to the elongate fibers. The short fibers extend beyond the confines of the carrier fibers. The fibers are of fiberglass, graphite, silica quartz or carbon. The produced tape is flat. The tape is wrapped around missile nose cones. The short fibers extend essentially normal to the surface of the cone when the elongate carrier fibers are wrapped tightly around the cone. After complete wrapping of the cone with the tape, a resin may be applied to the tape in order to secure the structure of the tape. The tape protects the missile nose cones from heat when the missile reenters the earth's atmosphere.

French Patent of Addition No. 79,835 relates to the same field of technology as U.S. Pat. No. 3,960,626. French Patent of Addition No. 79,835 relates to a method of protecting walls of engines, missiles or similar objects from erosion by hot gases. Fabrics produced of glass or silicon carbide fibers are applied to these objects. The surface of the fabrics is provided with loops; velour type fabrics are mentioned as an example. The fabric may have been preimpregnated with a resin such as a phenolic resin in order to maintain the loops in a perpendicular direction to the surface of the object to be protected.

However, above mentioned French Pat. No. 2 396 649, British Pat. No. 788,793, U.S. Pat. No. 3,960,626 and French Patent of Addition No. 79,835 relate to an entirely different field of technology and do not even address to the problem of surface imperfections.

U.S. Pat. No. 4,199,635 relates to a decorative laminate panel which is useful as interior wall panels for automobiles and the like. The panel comprises a woven or knit fabric (a) having a pile surface, a web (b) produced of thermoplastic textile melt fibers such as polyolefin fibers, a core layer (c) produced of loose synthetic textile fibers such as polyester or polypropylene, a second web (b) and a batt (d) of non-woven textile fibers such as polypropylene. The laminate panel is produced by applying layer (c) onto web (b), applying a second web (b) of melt fibers onto layer (c), needling layer (c) and the two layers (b) together to form a composite web, applying batt (d) on one side of the composite web and securing batt (d) to the composite web by needling, applying fabric (a) to the outer surface of web (b) and subjecting the composite material to heat and pressure to produce a shaped laminate panel. The produced panel is used without a further treatment as an interior part of automobiles. Its stated properties are dimensional stability, durability and resilience. Unfortunately, the produced panel does not have enough of strength to be used, for example, as a car body part. Due to the materials which are used for producing the laminate panel, the panel is not useful as a reinforcing material for a fiber reinforced plastic article either. U.S. Pat. No. 4,199,635 does not relate to a resin impregnated assembly of several layers and accordingly, does not even address to the above discussed problems of surface imperfections after curing of the resin. Furthermore, the production of the laminate panel according to U.S. Pat. No. 4,199,635 is time-consuming and expensive.

DETAILED DESCRIPTION OF THE INVENTION

Figure 1:
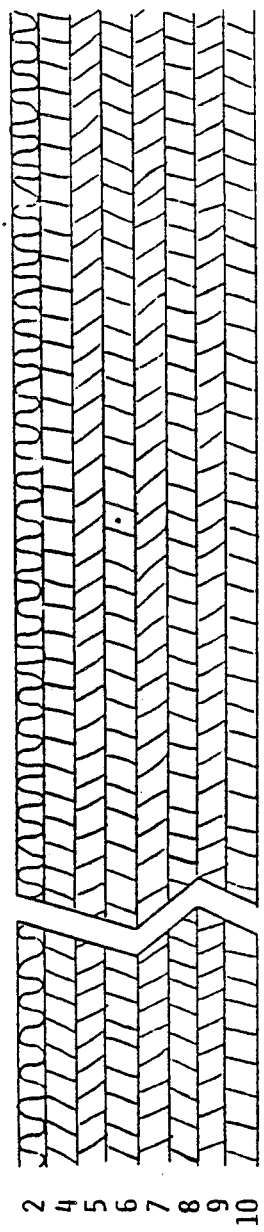

FIG. 1 illustrates a schematic view of a cross-section through one embodiment of the fiber reinforced plastic article of the present invention.

Figure 2:
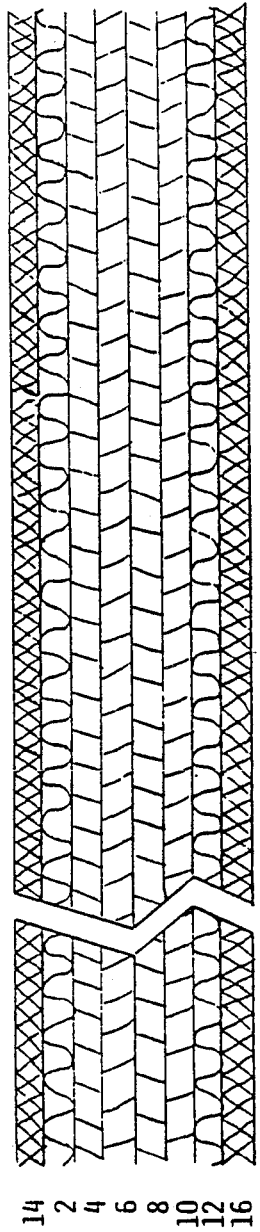

FIG. 2 illustrates a schematic view of a cross-section through another embodiment of the fiber reinforced plastic article of the present invention. Referring to FIG. 1, the fiber reinforced plastic article comprises reinforcing layers 4, 5, 6, 7, 8, 9 and 10. One of the external layers, i.e. layer 2, is made of a knitted or woven textile fabric having at least one tufted, fibrous, velvety, napped, brushed or pile surface. If layer 2 comprises only one such surface, this surface is opposite to the surface of layer 2 which is in contact with layer 4.

Tufting, napping and brushing procedures are known finishing procedures which are used in the textile industry to influence the appearance of the surface of the textile fabrics. Napping is a process that is for example applied to fabrics of woolens, cottons, spun silks, and spun synthetic organic fibers, including both woven and knitted types, to raise a velvety, soft surface. The process involves generally passing the fabric over revolving cylinders covered with fine wires that lift the short, loose fibers, usually from the weft yarns, to the surface, forming a nap. Brushing is a process usually accomplished by bristle-covered rollers. The process is used to remove loose threads and short fiber ends from smooth-surfaced fabrics and is also used to raise a nap on knits and woven fabrics.

If desired, the textile fabric is subjected to shearing, which cuts the raised nap to a uniform height and is used for the same purpose on pile fabrics. The amount of shearing depends upon the desired height of the nap or pile.

A pile fabric can be provided by pile weaves. Pile weaves have a ground fabric plus an extra set of yarns woven or tied into the ground and projecting from it as cut ends or loops. In warp pile fabrics the pile is formed by an extra set of warp yarns. It is known to the textile industry how to create such warp pile fabrics. As an alternative, weft-pile fabrics, which are also known to the textile industry, can be used.

The tufted, fibrous, velvety, napped, brushed or pile surface of the knitted or woven textile fabric is critical for the purpose of the present invention. Such a surface can also be obtained by other techniques known to the textile industry than those mentioned above. For example, such a surface can be obtained by using abraded yarns for producing the textile fabric. The abraded yarns may be produced in a known manner by roughening the surfaces of the yarn or cutting them at various intervals in order to produce a hairy effect.

Preferred examples of fabrics having the desired surface properties are, for example, a velvet or velvety fabric, velour, plush, barchant and, in particular, flannel.

Any knitted or woven textile fabric 2 having the above-mentioned features at one or both surfaces is useful. However, it is preferable to use a woven fabric which is preferably a close, fine weave having the above-mentioned surface properties. A close weave is defined here as a weave in which the yarns used to produce the weave occupy a large part of the area of the woven fabric, i.e. about 70 percent or more, preferably about 85 percent or more. A fine weave is defined here as a weave which has 20 or more ends (threads of yarn) per cm.

Known materials can be used for producing these textile fabrics such as wool, cotton, silk, linen, synthetic materials, such as viscose cellulose, cellulose acetate (often called Rayon), a polyamide, such as polyamide-6,6 (known under the trademark Nylon), an acrylonitrile homo- or copolymer, for example, Dralon and Orlon (Trademarks), a polyethylene glycol terephthalate, a polyester or a mixture thereof.

The textile fabric 2 described above covers the reinforcing layers 4, 5, 6, 7, 8, 9 and 10. It is understood that the fiber reinforced plastic article of the present invention does not need to have seven reinforcing layers. The fiber reinforced plastic article has at least one and, depending on the intended end-use, generally two or more reinforcing layers.

These reinforcing layers are produced of unidirectional, bidirectional, multidirectional or random fibers or combinations thereof, for example fabrics or mats, which are known for fiber reinforced plastic articles. Generally, fabrics or mats are woven but they can also be knitted or the fibers can be felted or bonded in any other way to give a mat. The term "fibers" as used herein includes also whiskers. In order to provide sufficient strength to the assembly and the fiber reinforced plastic article of the present invention the fibers are produced of carbon, boron, glass, silicon carbide or aromatic polyamides (the aromatic polyamide fibers are commonly called aramids), preferably poly-p-phenyleneterephthalamide, known under the designation Kevlar, or mixtures thereof. Often it is useful to use different materials for different reinforcing layers.

If desired, the layers in the assembly can be attached to each other, for example by sewing, stitching, stapling or by adhesive fixation.

The resins which are used as a matrix in the fiber reinforced plastic article of the present invention are known. Useful resins are for example acrylamates, polyester resins, vinyl ester resins, phenolic resins, epoxy resins or mixtures thereof.

The methods of impregnating the layers 2, 4, 5, 6, 7, 8, 9 and 10, which build the assembly of the present invention, are also known in the art. The knitted or woven textile fabric 2 having the tufted, fibrous, velvety, napped, brushed or pile surface allows a controlled resin content at the surface and minimizes the voids at the surface of the fiber reinforced plastic article of the present invention.

With reference to FIG. 2, another embodiment of the fiber reinforced plastic article of the present invention comprises the reinforcing layers 4, 6, 8 and 10, as described above. The reinforcing layers 4 and 10 are covered by the layers 2 and 12 which are made of a knitted or woven textile fabric and which have a tufted, fibrous, velvety, napped, brushed or pile surface on one or both sides as described above. If layers 2 and 12 comprise only one such surface, this surface is opposite to the surface of layers 2 and 12 which is in contact with layers 4 and 10. Furthermore, the fiber reinforced plastic article comprises layers 14 and 16 which are made of an in mould coat or gel coat layer, for example produced from a polyester, epoxy or polyurethane layer.

The fiber reinforced plastic article of the present invention can be coated with a finishing layer such as a paint or lacquer layer.

The fiber reinforced plastic articles can be produced according to known methods, such as hand lay up/spray up, die moulding and injection moulding. In these methods, the reinforcing layer(s) and the textile fabric(s) are placed in a mould. Whatever method is used, the layers must be arranged in such a way that the tufted, fibrous, velvety, napped, brushed or pile surface of the knitted or woven textile fabric faces the mould.

According to the hand lay up/spray up method the textile fabric 2 is placed in a mould. Then the textile fabric is impregnated with a resin, for example by spraying or pouring the resin on the textile fabric. Then a dry reinforcing layer 4 described above is placed in the mould and impregnated with the resin. The procedure is repeated with layers 5, 6, 7, 8, 9, 10 etc. until the desired thickness is achieved.

Instead of placing in the mould and impregnating one layer by one, two or more layers or even the complete assembly of layers of the present invention, which is used as reinforcing material, can be placed in the mould at once and then be impregnated.

The curing generally takes place by catalysis at room temperature or by means of heat lamps or warm-air ovens.

In the die moulding process the textile fabric and the reinforcing layers can be placed in the mould and impregnated, as described above. Additional layers, such as an additional knitted or woven textile fabric having a tufted, fibrous, velvety, napped, brushed or pile surface may be placed in the mould and impregnated. However the curing is carried out by combining the mould (female part) which contains the resin impregnated assembly of layers of the present invention with another mould (male part) which fits into the first female mould. The mould parts can then be heated in order to reduce the curing time of the resin.

In the injection moulding process the textile fabric and the reinforcing layer(s) are laid one by one or as a prefabricated assembly of several layers into the female part of the mould as described above, the female mould is then combined with the corresponding male mould, the mould is closed and the resin is injected into the mould.

What is claimed is:

1. An assembly of several resin-impregnated layers having
   (a) one or more reinforcing layers produced of unidirectional, bidirectional, multidirectional or random fibers or combinations thereof produced of glass, boron or carbon fibers, aromatic polyamide fibers, silicon carbide fibers or mixtures thereof, and
   (b) one or two knitted or woven textile fabrics (2, 12) having at least one tufted, fibrous, velvety, napped, brushed or pile surface,
   the textile fabric(s) (2, 12) being the external layer(s) of the assembly and the tufted, fibrous, velvety, napped, brushed or pile surface of the textile fabric(s) forming the surface(s) of the assembly.

2. The assembly of claim 1 wherein the textile fabric is produced of silk, wool, cotton, cellulose acetate, viscose cellulose, a polyamide, an acrylonitrile homo- or copolymer, a polyethylene glycol terephthalate, a polyester or a mixture thereof.

3. The assembly of claim 1 wherein the textile fabric is a velvet, velour, plush, barchant or flannel fabric.

4. The assembly of claim 3 wherein the reinforcing layer(s) (4, 5, 6, 7, 8, 9, 10) (is) are at least partially produced of poly-p-phenyleneterephthalamide fibers.

5. The assembly of claim 3 wherein the resin is a polyester, epoxy, phenolic, vinyl ester or acrylamate resin or a mixture thereof.

6. The assembly of claim 3 wherein the textile fabric is a woven fabric having 20 or more ends per centimeter.

7. The assembly of claim 1 wherein the reinforcing layer(s) (4, 5, 6, 7, 8, 9, 10) (is) are at least partially produced of poly-p-phenyleneterephthalamide fibers.

8. The assembly of claim 1 wherein the layers are attached to each other by sewing, stitching, stapling or by adhesive fixation.

9. The assembly of claim 1 wherein the resin is a polyester, epoxy, phenolic, vinyl ester or acrylamate resin or a mixture thereof.

10. The assembly of claim 1 wherein the textile fabric is a woven fabric having 20 or more ends per centimeter.

11. A fiber reinforced plastic article having a resinous matrix and a reinforcing material wherein the reinforcing material is an assembly of several layers having
    (a) one or more reinforcing layers produced of unidirectional, bidirectional, multidirectional or random fibers or combinations thereof produced of glass, boron or carbon fibers, aromatic polyamide fibers, silicon carbide fibers or mixtures thereof, and
    (b) one or two knitted or woven textile fabrics (2, 12) having at least one tufted, fibrous, velvety, napped, brushed or pile surface,
    the textile fabric(s) (2, 12) being the external layer(s) of the assembly and the tufted, fibrous, velvety, napped, brushed or pile surface of the textile fabric(s) forming the surface(s) of the assembly.

12. The fiber reinforced plastic article of claim 11 wherein the textile fabric is a velvet, velour, plush, barchant or flannel fabric.

13. The fiber reinforced plastic article of claim 11 wherein the textile fabric is a woven fabric having 20 or more ends per centimeter.

14. The fiber reinforced plastic article of claim 11 wherein the textile fabric is coated with a finishing layer (14, 16).

15. A process for producing a fiber reinforced plastic article having a resinous matrix and a reinforcing material, wherein
    a knitted or woven textile fabric having at least one tufted, fibrous, velvety, napped, brushed or pile surface is placed in a mold in such a way that the tufted, fibrous, velvety, napped, brushed or pile surface faces the mold, one or more reinforcing layers produced of unidirectional, bidirectional, multidirectional or random fibers or combinations thereof produced of glass, boron or carbon fibers, aromatic polyamide fibers, silicon carbide fibers or mixtures thereof are placed onto the knitted or woven textile fabric, the knitted or woven textile fabric and the reinforcing layer(s) are impregnated with a resin before or while they are, or after they have been, placed in the mold and the resin is then cured.

* * * * *